Nov. 7, 1939.   R. B. MILLARD   2,179,131
METHOD AND APPARATUS FOR TREATING EMULSIONS
Filed Dec. 27, 1937   2 Sheets-Sheet 1
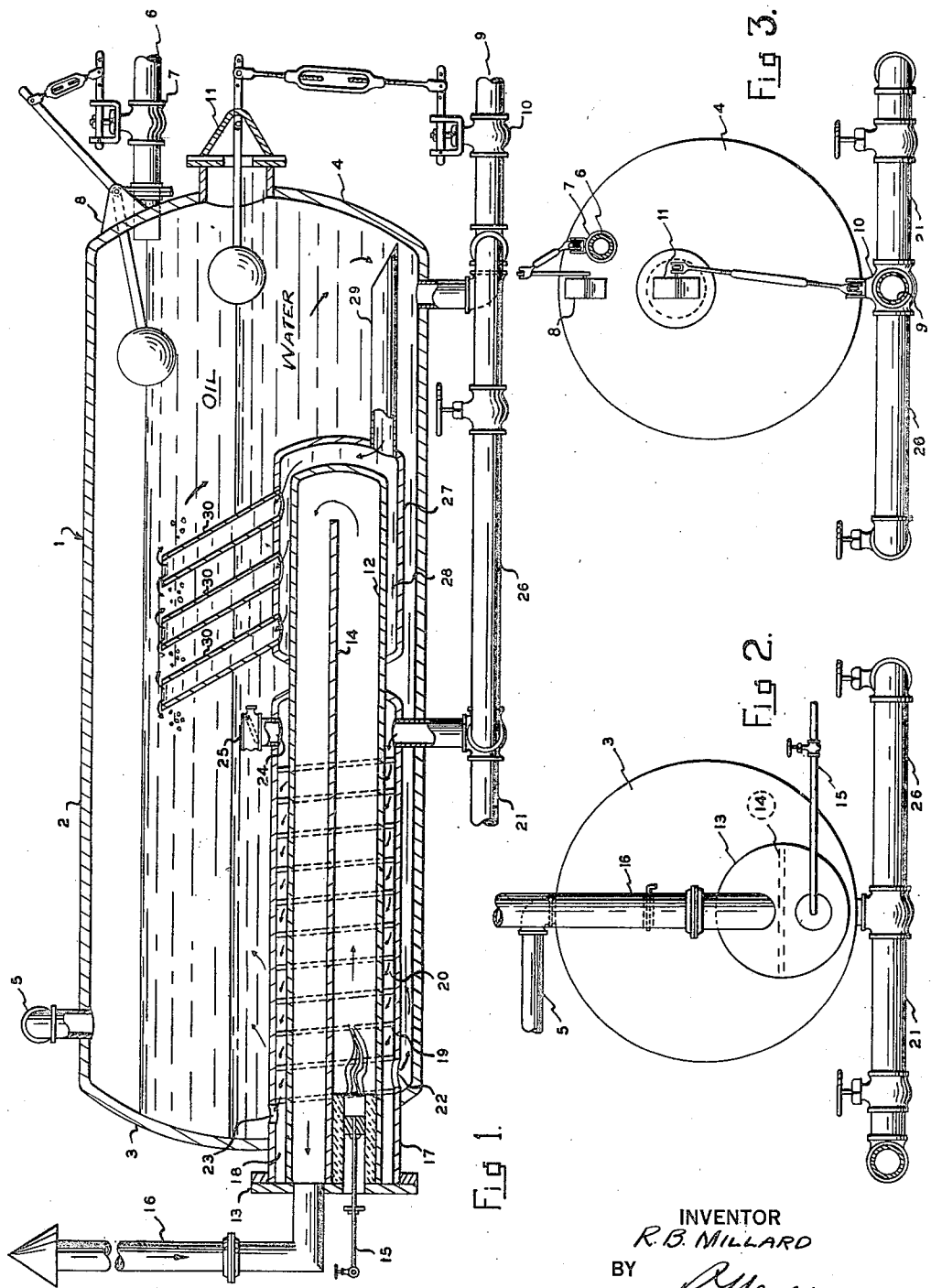
INVENTOR
R. B. MILLARD
BY
ATTORNEY Patented Nov. 7, 1939

2,179,131

UNITED STATES PATENT OFFICE 2,179,131

METHOD AND APPARATUS FOR TREATING EMULSIONS

Raymond B. Millard, Tulsa, Okla.

Application December 27, 1937, Serial No. 182,030

9 Claims. (Cl. 196—5)

This invention relates to improvements in methods and apparatus for treating emulsions, such as petroleum oil-water emulsions to resolve same into their constituent oil and aqueous phases, and particularly to novel methods and apparatus for the heating of such emulsions and for the gravity separation of their phases.

In the treating of petroleum oil-water emulsions to resolve such emulsions into their constituent oil and water phases, heating of the emulsions, followed by gravity separation of the phases in a settling zone, comprise the principal steps of most conventional treating methods. Chemical agents may be, and often are, used to hasten or assist the breaking down of the emulsions, although efficient and properly applied heating and effective settling remain the primary treating agents for breaking emulsions, and numerous modifications in methods and apparatus have been designed to improve the efficiency of these primary agents.

This invention contemplates generally, a method and apparatus wherein emulsion to be treated is introduced into one end of a combined heating-settling tank and is heat treated therein to effect a resolution of the emulsion into its constituent oil and aqueous phases, and the separated phases discharged separately from the opposite end of the heater-settler. To heighten the efficiency of the treating and settling operations, a heater is positioned within the heating-settling tank and a directed thermosyphonic circulation of the separated aqueous phase is established in a portion of the heater-settler where the emulsion normally tends to lose heat. By means of the thermo-syphon circulation, relatively cool aqueous liquid is reheated in the internal heater and discharged into the separated oil phase, above the level of the aqueous phase, and thereby caused to flow downwardly through the oil phase so as to reheat the oil phase and to effect a gentle washing of the oil phase to wash out globules of the aqueous phase which remain suspended in the oil phase, without detrimental agitation of the oil phase.

Initial heating of the emulsion may be effected in the internal heater by flowing the oil in a restricted stream therethrough, before discharge into the heating-settling tank. Or, the emulsion may be heated initially outside the heating-settling tank and then introduced into the tank.

Therefore, this invention has for its principal object the provision of a method of treating oil-water emulsions, whereby emulsions may be heated efficiently and separated more effectively into the constituent oil and aqueous phases.

Another object is the provision of a method of treating emulsion, whereby novel heating steps are combined with novel steps for washing the separated oil phase of the emulsion with an aqueous liquid to effect a more efficient separation of the emulsion into its constituent oil and aqueous phases.

Additional objects are for the provision of improved forms of apparatus suitable for practicing the method of this invention.

Numerous other objects and advantages of this invention will become apparent from the following description when read in conjunction with the accompanying drawings which illustrate several forms of apparatus in accordance with this invention.

In the drawings:

Fig. 1 is a longitudinal sectional elevation of treating apparatus in accordance with this invention.

Figs. 2 and 3 are end elevations of the left and right hand ends, respectively, of the apparatus shown in Fig. 1.

Figure 4:
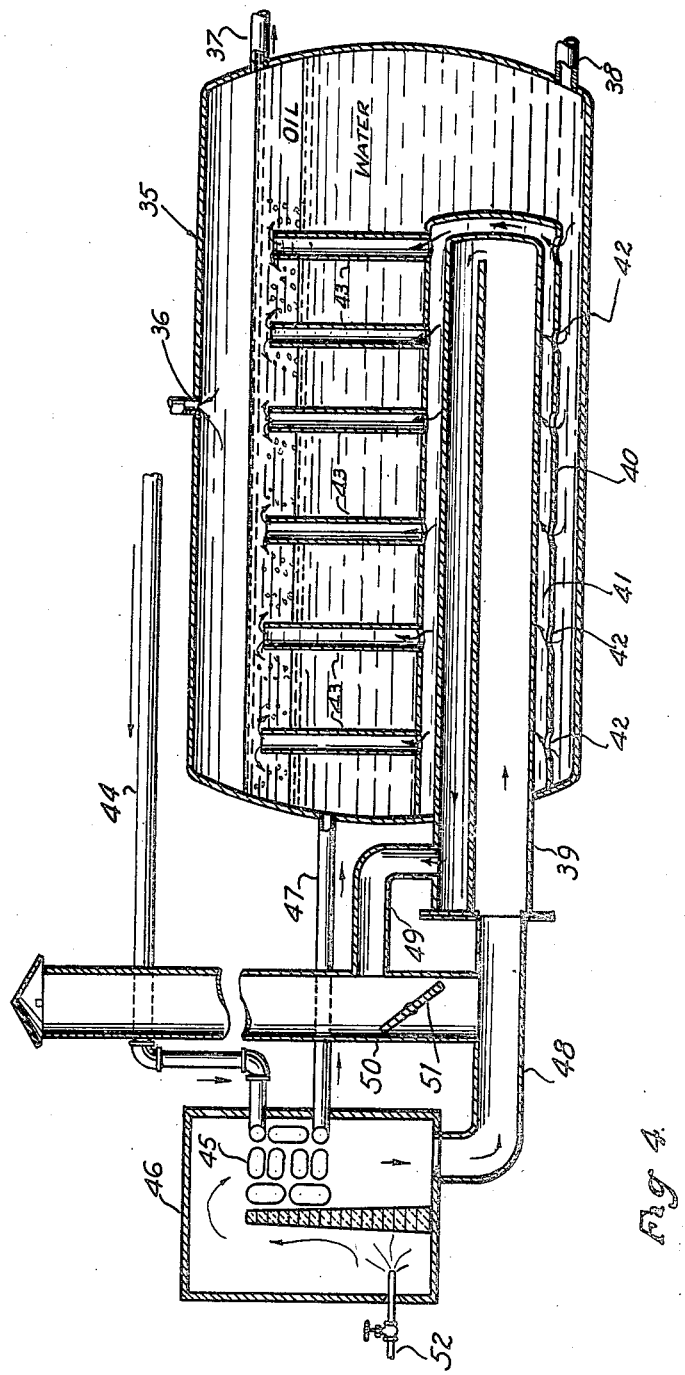
Fig. 4 is a view similar to that of Fig. 1 of another modification of apparatus in accordance with this invention.

Referring to Figs. 1, 2 and 3 in particular, a treating tank, denoted generally by the numeral 1, consists of a tubular shell 2 of enlarged diameter and preferably horizontally positioned. Shell 2 is provided with left and right ends 3 and 4, respectively, and at its upper side with a vapor discharge pipe 5, and at right end 4 with an oil discharge pipe 6, communicating with the interior of the shell at a point above the horizontal median line thereof. Pipe 6 is fitted with a valve 7 operated by a liquid level controller 8 adapted to control the level of the oil phase in the treating tank. A water discharge pipe 9 is connected to the bottom of shell 2 at a point near right end 4 and is fitted with a valve 10 operated by a liquid level controller 11 which is operative by the level of the water phase in the tank, which is maintained ordinarily at about the mid-point of the tank.

Mounted in left end 3 near the bottom of the tank is a heating tube 12 which extends longitudinally from a point outside tank 1 into the tank and parallel to the bottom thereof to a point spaced from right end 4 of the tank but some distance beyond the longitudinal midpoint of the tank. The inner end of heating tube 12 is closed and the outer end provided with a flanged cover 13. A baffle 14 constructed of suitable heat resistant material extends longitudinally inside heating tube 12 from the outer end thereof to a point spaced from the closed inner end of the heating tube, and thus divides the heating tube into a two-pass heater, in the lower portion of which is mounted a burner 15 which generates heating gases. The heating gases flow through the heating tube beneath baffle 14 to the end thereof, then in the reverse direction above the baffle to a stack 16 connected into the outer end of the heating tube through cover 13. A tubular jacket 17 surrounds a portion of heating tube 12 extending from the outer end of the tube to a point about midway of the treating tank, and the terminal ends of the jacket 17 are sealed relative to the exterior of the heating tube. An annular space 18 is thus provided between the outer surface of heating tube 12 and the inner wall of jacket 17. A spiral baffle 19 pitched toward the outer end of the heating tube is positioned in annular space 18, forming a spiral passageway 20 in annular space 18, which extends from the inner end of jacket 17 to a point just inside the left hand end 3 of the treating tank.

An emulsion charging pipe 21 extends into the treating tank through shell 2 and communicates with inner end of spiral passageway 19 at a point near the inner end of jacket 17. An opening 22 is provided in the lower side of jacket 17 at the opposite end of the spiral passageway. By means of this arrangement, emulsion entering the system through pipe 21 will flow in a spiral path over the surface of the heating tube and will be discharged through opening 22 into shell 2 at a point near the bottom of the shell and adjacent to the left hand end thereof. A vent hole 23 is provided in the upper side of jacket 17 near left hand end 3 to permit the escape of vapors which may accumulate in the outer end of annular space 18. A pipe 24 fitted with a check valve 25 opening downwardly is connected to the upper side of jacket 17 at a point near its inner end. A valved by-pass pipe 26 connects water discharge pipe 9 to emulsion charging pipe 21.

The portion of heating tube 12 which extends inwardly of the treating tank beyond the portion surrounded by jacket 17, is separately enclosed by a second jacket 27, concentrically mounted thereon forming an annular space 28 about this portion of heating tube 12. A pipe 29 is connected into the right hand end of jacket 27 at a point near the lower side thereof and extends longitudinally parallel to the bottom of tank 1 through the space between the end of jacket 27 and the right hand end 4 of the treating tank to a point adjacent to end 4. The right hand end of pipe 29 is in open communication with the interior of the tank, and thus places the interior of the tank in communication with annular space 28. A plurality of spaced hollow risers 30 extend upwardly from the upper side of jacket 27 to a point just beneath the level normally attained in the tank by the oil phase separated from the emulsion during treatment in the apparatus. Risers 30 are open at their upper ends and are in open communication with annular space 28 through their lower ends. Risers 30 are preferably sloped upwardly and rearwardly in the direction of left hand end 3 of tank 1.

The above described apparatus is utilized in the practice of the method of this invention in the following manner:

Treatment is usually begun by partially filling tank 1 with an aqueous liquid such as salt water, which is similar to the aqueous phase ordinarily separated from the emulsion. It will be understood that fresh water or other aqueous liquid may be utilized instead of the salt water. The salt water is introduced into the treating tank through pipe 21 until the level of water is above the heating tube 12 and jacket 17, whereupon burner 15 is set in operation to generate heating gases and to heat the salt water to a temperature approaching the desired treating temperature. Check valve 25 and pipe 24 provide a safety device for permitting water to flow downwardly into annular space 18, in the event the supply of water to tank 1 is cut off after the water level is above the check valve, and it is desired to permit some circulation of water through space 18 to prevent overheating of the heating tube.

By opening the valve in by-pass 26 and holding valve 10 closed, the water may be circulated from the discharge end of tank 1 through pipe 9, by-pass 26 and pipe 21 through annular space 18 and back into the tank through opening 22, and the water may thus be heated to the desired temperature.

When the water is at the proper temperature, emulsion to be treated is charged to the system through pipe 21, and flows over the surface of heating tube 12 through annular space 18 and is discharged through opening 22 into the lower portion of the tank. In flowing through annular space 18, the emulsion is constrained by means of spiral baffle 19 to flow in a restricted stream through passageway 20. In this manner, the emulsion is caused to flow in a relatively thin film over the surface of heating tube 12, which results in a rapid transfer of heat through the wall of heating tube 12 to the stream of emulsion and effects a rapid and efficient heating of the emulsion to the desired treating temperature. At the same time, some heat is indirectly transferred from the heated emulsion through the wall of jacket 17 into the water in the tank. The heated emulsion emerging through opening 22 into the body of water in the tank transfers its heat directly to the water. Since the water is usually already at about the treating temperature, the heat transferred thereto from the emulsion will serve largely to maintain the water and the emulsion at the desired treating temperature.

The heated emulsion emerging into the tank from opening 22 will immediately begin to break down into its constituent oil and water phases, which will separate from each other due to the difference in their specific gravity. The water phase will merge with water in the tank while the separated oil together with some unbroken emulsion will rise through the body of water and collect on the surface thereof. As opening 22 is adjacent left end 3 of the tank, the oil will rise almost directly upward to the top of the water level and will then move forwardly along the water toward the oil discharge pipe 6. As the oil and water levels build up in the tank, liquid level controllers 8 and 11 will operate to open valves 7 and 10, respectively, to permit discharge through pipes 6 and 9 of separated oil and water in proportion to the rate of input of emulsion so as to maintain the desired levels in the tank.

As the oil and water flow toward their respective outlets from right end 4 of the tank, some heat will be lost from these materials, through radiation from the tank surfaces and vaporization of some of the oil fractions and the water, and the separated liquids will become progressively cooler as the liquids move beyond the end of the heating tube.

The oil flowing toward the exit from the tank will carry with it some unbroken emulsion and some water, which, though no longer emulsified with the oil, is of such fine particle size as to remain suspended in the oil, particularly when the temperature of the oil falls below the optimum treating temperature. In order to maintain the optimum treating temperature during the final settling stages, to assist in resolving the unbroken emulsion and to wash the suspended water particles from the oil phase, the thermo-syphonic circulation feature of this invention is brought into play. A portion of relatively cool aqueous liquid separated from the emulsion and being withdrawn from the tank through pipe 9, will be drawn, by thermo-syphonic action, into the open end of pipe 29, and through this pipe into jacket 27 adjacent the lower portion thereof. The aqueous fluid entering jacket 27 will be reheated by heat transferred thereto through heating tube 12, and will rise upwardly through risers 30 and overflow therefrom into contact with the body of separated oil and emulsion. As the open ends of risers 30 are positioned very near to the upper surface of the oil phase, the aqueous fluid, which is discharged from the risers, will sink downwardly through the oil phase and will reheat the oil to the optimum temperature, which will assure complete separation of the oil phase from the aqueous phase by the time these phases will have reached the discharge end of the tank.

The scrubbing effected by the downward flow of aqueous fluid through the oil phase will effectively break down any remaining unbroken emulsion and will scrub fine globules of suspended water from the oil. Risers 30 are preferably sloped rearwardly of the tank so as to increase, to as great an extent as possible, the effective separation area through which the reheating and washing effect takes place.

The number of risers 30 and their arrangement, ordinarily will be such as to distribute the heated aqueous liquid substantially uniformly through the oil phase.

As the difference in temperature producing the thermo-syphon circulation, ordinarily is relatively small, the circulation will be relatively quiescent, and the heated fluid will be discharged into the oil body in a plurality of more or less gently flowing streams which will minimize agitation of the oil and greatly reduce the possibility of re-emulsification of the oil with the aqueous liquid, a condition which occurs frequently in other types of treating systems.

The treating temperature will be varied, of course, with the nature of the emulsion to be treated. Likewise, the treating pressure is subject to considerable variation.

When required, chemical treating agents of a character well known to those skilled in the art, may be used, and ordinarily, will be mixed with the emulsion entering the treating system.

From the foregoing description of the method and apparatus of this invention, it will be evident that a highly efficient method of heating is provided, wherein emulsion is subjected to film heating in a heating zone immersed in a body of emulsion undergoing treatment, and wherein heat losses from the emulsion during treatment are greatly minimized.

In some cases, the directed thermo-syphon circulating system may not be required, and sufficient heat for all purposes supplied by heating tube 12, through the indirect transfer of heat from the restricted stream of emulsion flowing through spiral passageway 20 to the body of fluid in tank 1.

In every case, all heat transferred from heating tube 12 to the emulsion flowing through annular space 18, will be transmitted to the body of fluid in tank 1, both directly and indirectly, and heat losses thereby minimized and heating costs greatly reduced.

Fig. 4 illustrates another modification of apparatus wherein the initial heating of the emulsion is accomplished externally of the treating tank.

In this modification, the treating tank, designated generally by numeral 35, is of the same general shape and arrangement as that shown in Figs. 1, 2 and 3 as previously described. The tank is provided with a vapor discharge pipe 36, an oil discharge pipe 37 and a water discharge pipe 38. A baffled heating tube 39 is mounted in the lower portion of the tank, and is provided with a concentric jacket 40 forming an annular space 41 between the tube and jacket, substantially as previously described. Annular space 41 communicates with the interior of the tank through a plurality of longitudinally spaced openings 42 in the lower side of jacket 40 and on the upper side of the jacket are arranged a plurality of longitudinally spaced risers 43 which communicate with annular space 41 and have open upper ends terminating just beneath the normal oil level in the tank.

A charging pipe 44 leads through a tube bank 45 mounted in a heating furnace 46, from which a pipe 47 discharges heated emulsion into the left hand end of tank 35 at a point above the horizontal median line of the tank. A breeching 48 connects the flue gas passageway of the furnace below tube bank 45 to heating tube 39 below the baffle therein, and a breeching 49 connects the flue gas passageway above the baffle in heating tube 39 to a stack 50 which also communicates with breeching 48 and is provided with a damper 51 between the points of entrance into the stack of breechings 48 and 49. Furnace 46 is provided with a burner 52 for generating combustion gases in the furnace.

The method of this invention, as practiced by the modification of apparatus shown in Fig. 4 consists in establishing a body of preheated aqueous liquid, such as water, fresh or salt, introduced into tank 35 but circulated therein largely by thermo-syphon flow until a suitable temperature is attained. Emulsion is then introduced into pipe 44, through tube bank 45 and thence through pipe 47 into the left end of tank 35 at a point ordinarily above the horizontal median line of the tank.

The emulsion is heated in passage through tube bank 45 to a suitable treating temperature by heating gases generated in furnace 46 by means of burner 52. The heated emulsion entering tank 35 breaks down into its constituent oil and water phases as the emulsion flows toward the opposite end of the tank. Heat lost by the emulsion in passage through tank 35 is replaced by passing at least part of the flue gases leaving furnace 46 through breeching 48, into heating tube 39 and thence through the baffled passageway in the heating tube, from which heat is transferred to the material in tank 35, and the exit gases from the heating tube discharged through breeching 49 into stack 50. By suitable manipulation of damper 51, the volume of flue gases sent through heating tube 39 may be controlled in accordance with the quantity of heat required to maintain the treating and settling temperature in tank 35.

The heat contained in the flue gases passing through heating tube 39 is transferred indirectly to the liquid materials in tank 35 through jacket 40 and directly thereto, through a directed thermo-syphonic circulation of the aqueous liquid in the tank.

The thermo-syphon action draws the relatively cool aqueous fluid from along the bottom of tank 35, through openings 42, thence through annular space 41, wherein the aqueous fluid flows over the surface of heating tube 39 and is heated to the desired temperature, thence upwardly through risers 43, which discharge the heated aqueous fluid into the body of the oil layer, to effect the heating and scrubbing action thereon, as in the previously described modification. The finally separated oil and aqueous phases are removed through pipes 37 and 38, respectively, which are preferably provided with liquid level controls, not shown but similar to those shown and described heretofore.

It will be evident from the above description of the secondary modification, that the method thereof differs from that of the first modification in that the step of initially heating the emulsion is accomplished externally of the settling zone instead of within the settling zone. The step of maintaining the treating and settling temperature of the body of emulsion within the settling zone, by a directed thermo-syphonic circulation is present in both modifications.

The apparatus of the second modification is altered from that of the first modification, as is evident, to conform with the modification in the method steps.

In connection with the first described modification of this invention, it will be understood that under some circumstances, spiral baffle 19 may not be used and the emulsion will flow more or less directly through annular space 18 from pipe 21 to outlet 22. However, sufficient back pressure will be maintained in annular space 18 to maintain the space filled with liquid at all times.

Various changes may be made in the method steps of this invention, and various alterations and modifications made in size, form and arrangement of the details of the apparatus without departing from the scope of the appended claims.

What I claim and desire to secure by Letters Patent is:

1. The method of resolving oil-water emulsions which comprises, heating emulsions to a resolving temperature while flowing in a confined stream through a heating zone immersed in a body of aqueous liquid maintained in a separating zone, introducing the heated emulsion directly into said body of aqueous liquid in said separating zone to thereby heat said body of aqueous liquid to a suitable separating temperature, therein separating said emulsion into an aqueous phase which merges in said body of aqueous liquid and an oil phase which accumulates above the upper surface of said body of aqueous liquid, and thermo-siphonically circulating a confined stream of aqueous liquid from the body thereof through said heating zone to a point within said oil phase and then discharging said aqueous liquid downwardly through said oil phase and in direct contact therewith into said body of aqueous liquid to thereby maintain said body of aqueous liquid and said oil phase at said separating temperature.

2. The method of resolving oil-water emulsions which comprises, maintaining a body of aqueous liquid in a separating zone, flowing hot gases of combustion through a heating zone immersed in said body of aqueous liquid, flowing emulsion in a confined stream through said heating zone in simultaneous indirect heat-transfer relationship with both said gases of combustion and said body of aqueous liquid, thereafter discharging said stream of emulsion from said heating zone directly into said body of aqueous liquid in said separating zone, therein resolving the emulsion into its constituent oil and water phases, and establishing a confined thermo-syphonic circulation of aqueous liquid from said body thereof through said heating zone to a point above the level of said body of aqueous liquid but within said oil phase and then discharging said aqueous liquid downwardly through said oil phase and in direct contact therewith back to said body of aqueous liquid.

3. Apparatus for treating emulsions comprising, a treating chamber, a heating chamber positioned within said treating chamber, a jacket spaced from and surrounding said heating chamber, a conduit leading from the exterior of said treating chamber into said jacket, a passageway from said jacket into said treating chamber, a vapor discharge conduit communicating with the upper portion of said treating chamber, a first discharge pipe communicating with the lower portion of said treating chamber and a second discharge pipe communicating with an intermediate portion of said treating chamber.

4. Apparatus for treating emulsions comprising, a treating chamber, a heating chamber positioned within said treating chamber, a jacket spaced from and surrounding said heating chamber, a conduit leading from the exterior of said treating chamber into said jacket, a passageway from said jacket into said treating chamber, a spiral baffle positioned in the space between said jacket and said heating chamber and extending from said conduit to said passageway, a vapor discharge conduit communicating with the upper portion of said treating chamber, a first discharge pipe communicating with the lower portion of said treating chamber, and a second discharge pipe communicating with an intermediate portion of said treating chamber.

5. Apparatus for treating emulsions comprising, an elongated horizontally arranged treating chamber, a heating chamber extending longitudinally into said treating chamber, a first jacket spaced from and surrounding a portion of said heating chamber within said treating chamber, a conduit leading from the exterior of said treating chamber into one end of said first jacket, a passageway from the opposite end of said first jacket into said treating chamber, a second jacket spaced from and surrounding another portion of said heating chamber within said treating chamber, a suction conduit placing the lower portion of said second jacket in communication with the lower portion of said treating chamber, a plurality of hollow risers placing the upper portion of said second jacket in communication with the upper portion of said treating chamber, a vapor discharge conduit communicating with the upper portion of said treating chamber, a first discharge conduit communicating with the lower portion of said treating chamber, and a second discharge conduit communicating with an intermediate portion of said treating chamber.

6. Apparatus for treating emulsions comprising in combination with an elongated horizontally arranged treating chamber having a vapor discharge conduit communicating with the upper portion thereof, a first liquid discharge pipe communicating with the lower portion thereof and a second liquid discharge pipe communicating with an intermediate portion of the treating chamber through one end thereof, a heating tube extending longitudinally into said treating chamber from the opposite end thereof, a jacket concentrically enclosing said heating tube within the treating chamber to provide an annular space between said jacket and said heating tube, a conduit leading from the exterior of said treating chamber into said jacket at a point spaced longitudinally from said opposite end of the treating chamber, a passageway from the interior of said jacket into said treating chamber, said passageway positioned adjacent the opposite end of said treating chamber, and a burner mounted in the end of said heating tube extending exteriorly of said opposite end of said treating chamber.

7. Apparatus for treating emulsions comprising in combination with an elongated horizontally arranged treating chamber having a vapor discharge conduit communicating with the upper portion thereof, a first liquid discharge pipe communicating with the lower portion thereof and a second liquid discharge pipe communicating with an intermediate portion of the treating chamber through one end thereof, an elongated heating tube extending longitudinally into said treating chamber through the opposite end thereof, a first jacket concentrically enclosing a portion of said heating tube within said treating chamber adjacent said opposite end to thereby provide an annular space between said jacket and said portion of the heating tube, a conduit leading from the exterior of the treating chamber and communicating with said annular space at a point spaced longitudinally from said opposite end, a passageway through said jacket adjacent said opposite end providing communication between said annular space and the interior of said treating chamber, a second jacket concentrically enclosing a second portion of said heating tube more distantly removed from said opposite end to thereby provide an annular passageway between said second jacket and said second portion of said heating tube, a suction conduit for placing the lower portion of said treating chamber in communication with a low point in said annular passageway, a plurality of hollow risers for placing an upper portion of said annular passageway in communication with the upper portion of said treating chamber, and means for circulating heating gases through said heating tube.

8. Apparatus for treating emulsions comprising, an elongated horizontally arranged treating chamber adapted to contain a body of emulsion under treatment, means for generating heating gases, means for conveying said heating gases through said body of emulsion but out of direct contact therewith, means for flowing a confined stream of emulsion through said body thereof and into indirect heat-transfer relationship with said heating gases, means for discharging said stream of emulsion directly into said body of emulsion, means for establishing a confined thermo-syphon circulation of an emulsion phase from the lower portion of said body of emulsion, then into contact with said heating gas conveying means and upwardly therefrom to an upper portion of said body of emulsion and then discharging the emulsion phase into downwardly flowing direct contact with said body of emulsion, and means for withdrawing separated emulsion phases from vertically spaced points in said treating chamber.

9. Apparatus for treating emulsions comprising, an elongated horizontally arranged treating chamber, an internally fired heater extending longitudinally through said treating chamber, a first restricted fluid conducting passageway surrounding a first portion of said heater extending from a point intermediate the length of said treating chamber to a point adjacent one end thereof, a conduit leading from the exterior of said treating chamber and communicating with one end of said passageway, the other end of said passageway communicating with the interior of said chamber at a point adjacent the end thereof, a second restricted passageway surrounding a second portion of said heater which extends inwardly of said treating chamber from said first portion of the heater, a conduit placing the lower portion of said second passageway in open communication with the lower portion of said treating chamber, a plurality of hollow risers placing another portion of said second passageway in communication with the upper portion of said treating chamber, and a pair of vertically spaced discharge pipes communicating with the end of said treating chamber farthest removed from the point of entrance therein of said first passageway.

RAYMOND B. MILLARD.